United States Patent Office 3,538,079
Patented Nov. 3, 1970

3,538,079
METHOD FOR THE PREPARATION OF A WATER INSOLUBLE, BASIC DYEABLE, HEAT STABLE CELLULOSE DERIVATIVE
Bruce B. Allen, Mecklenburg, N.C., and Henry W. Steinmann, Sussex County, N.J., assignors to Celanese Corporation, New York, N.Y., a corporation of Delaware
No Drawing. Continuation-in-part of application Ser. No. 427,148, Jan. 21, 1965. This application May 14, 1968, Ser. No. 728,925
Int. Cl. C08b *3/00*
U.S. Cl. 260—215
15 Claims

ABSTRACT OF THE DISCLOSURE

A process of producing a water insoluble, basic dyeable, heat stable cellulose derivative comprising reacting the cellulose derivative with o-sulfobenzoic anhydride in the presence of an acid catalyst.

---

This application is a continuation-in-part of U.S. application Ser. No. 427,148, filed Jan. 21, 1965, now abandoned.

This invention relates to a method of improving the dye-receptivity and to the stabilizing of cellulosic materials. More particularly, this invention relates to the treatment of a cellulosic material with o-sulfobenzoic anhydride in the presence of an acid catalyst to introduce sulfobenzoic groups thereinto, whereby the resulting material exhibits improved stability to elevated temperatures and also exhibits a good receptivity for basic dyes.

Cellulose and cellulose esters such as, e.g., cellulose acetate, are frequently used for the formation of fibers. It is generally desirable to dye such cellulosic fibers. Heretofore, however, such fibers have been difficult to dye satisfactorily with basic dyes inasmuch as they do not exhibit adequate basic dye receptivity. Moreover, such fibers have also been disadvantageous in that they have not shown an altogether adequate heat stability. Thus such fibers have tended to discolor and darken when exposed to the elevated temperatures encoutered in laundering and drying of fabrics made of such fibers.

Accordingly, it is an object of this invention to provide a modified cellulosic material containing sites therein whereby such material is rendered receptive to basic dyes.

Another object is to provide a method for stabilizing cellulosic materials against the action of heat such that such materials can be exposed to elevated temperatures without discoloration.

Additional objects, characteristics and advantages of our invention will become apparent from the following detailed description.

In accordance with one aspect of our invention, a cellulose ester containing available (free) hydroxyl groups, is treated, in the presence of an acid catalyst, with o-sulfobenzoic anhydride,

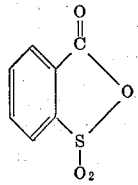

to thereby introduce sulfobenzoate groups into the cellulose ester.

The cellulose esters which may be employed according to this embodiment are preferably the lower alkanoic acid esters such as the acetate, propionate, butyrate, acetate-propionate, acetate-butyrate, and the like. Inasmuch as the o-sulfobenzoic anhydride is to effect introduction of sulfobenzoate groups into the cellulose ester, there must initially be present in the cellulose ester free hydroxyl groups, as it is these groups which react with the o-sulfobenzoic anhydride. A cellulose triester such as, e.g., cellulose triacetate, may be employed as the starting material provided that such tri-ester does contain some free hydroxyl groups.

The cellulose ester, e.g., cellulose acetate, should desirably have an acetyl content not exceeding about 62 percent and preferably from about 54 to 61.5 percent by weight, calculated as acetic acid.

It is important that an acid catalyst, preferably a strong acid having an ionization constant of at least $1 \times 10^{-3}$, be utilized in conjunction with the o-sulfobenzoic anhydride. Suitable acid catalysts include organic sulfonic acids such as p-toluene sulfonic acid and methylene disulfonic acid, perchloric acid, methanesulfonic acid, with particular preference being accorded p-toluene sulfonic acid.

U.S. Pat. 2,241,235 discloses the preparation of a water-soluble cellulose acetate sulfobenzoate by the reaction of cellulose acetate containing available hydroxyl groups with o-sulfobenzoic anhydride in the presence of a basic catalyst, namely pyridine. Cellulose acetate sulfobenzoate prepared by the process of this patent exhibits very poor heat stability. The pyridinium salt turns black when heated for 5 minutes at 220 degrees centigrade. When the pyridinium salt was neutralized with triethylamine, it still turned brown after 5 minutes exposure at 220 degrees centigrade. The preparation of cellulose acetate sulfobenzoate by reacting o-sulfobenzoic anhydride, in the presence of an acid catalyst, with cellulose acetate containing free hydroxyl groups or with cellulose, followed by acetylation with acetic anhydride, has not been reported.

To obtain basic dyeability, the o-sulfobenzoic anhydride must split so that the final product contains a dangling sulfonic group to accept a basic dye. As can be seen from the formula:

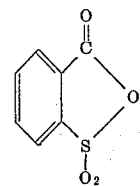

If the mixed anhydride splits at the wrong place, the final product will contain a dangling carboxyl group, which will not accept basic dyes to any appreciable extent. Therefore, in the process of this invention it is important that the mixed anhydride split at the right place to produce the desired product containing dangling sulfonic moieties.

If a basic catalyst splits a mixed anhydride in one way, it would be expected that an acid catalyst would split it the other way. This is especially true where the ionization constants of the two acid groups of the mixed anhydrides are radically different. Thus, in o-sulfobenzoic anhydride the sulfonic is a much stronger acid than the carboxyl as shown by the ionization constants:

Benzoic acid _____ $6.6 \times 10^{-5}$
Benzene sulfonic acid _____ $2 \times 10^{-1}$ Therefore, in the o-sulfobenzoic anhydride, the sulfonic group should create a strong dipole moment. An acidic (hydrogen ion) catalyst would not relieve the dipole moment created but a basic catalyst should tend to neutralize the dipole moment and cause the molecule to split in a different manner.

Since the process of U.S. Pat. 2,241,235 produces a water-soluble cellulose acetate sulfobenzoate by reacting a cellulose acetate with o-sulfobenzoic anhydride in the presence of a basic catalyst, one would expect that an acid catalyst would split the mixed anhydride the other way to produce a cellulose acetate carboxyphenyl sulfate. The fact that the process of this invention, utilizing an acid catalyst, unexpectedly produces a water-insoluble, heat stable, basic dyeable cellulose acetate sulfobenzoate by reacting o-sulfobenzoic anhydride with cellulose acetate or cellulose, which will subsequently be acetylated after reaction, represents the essence of this invention. The process of this invention yields the water-insoluble sulfobenzoic acid ester of cellulose having about 2.7 mole percent of sulfobenzoate groups, and from about 0.2 to about 1.5 percent by weight of sulfur, after a reaction time of from about 30 to 180 minutes. In contrast, the process of U.S. Pat. 2,241,235 requires at least 9 hours and yields a water soluble product with very low heat stability and a sulfobenzoate content of about 27 percent.

The process of this invention is desirably carried out by dissolving the cellulose ester, e.g., cellulose acetate in a solvent such as dioxane, alone or mixed with other compounds, e.g., chlorinated hydrocarbons such as ethylene chloride. A relatively high concentration of cellulose ester in the solvent is preferred, typically from about 10 to 20 parts by weight of cellulose ester per 100 parts of solvent.

The catalyst concentration should be relatively low so as to minimize any degradation of the cellulose ester. Thus, a suitable catalyst concentration is from about 0.1 to 1.0 weight percent at elevated temperature most suitable for the reaction, e.g., 60 degrees centigrade, based upon the weight of the cellulose ester. Higher percentages of catalyst may be used at lower temperatures.

The reaction is generally carried out at a temperature of from about 25 to 100 degrees centigrade. A more preferred range is from about 50 to 70 degrees centigrade at 1 percent or less of catalyst. Thus, temperatures in excess of about 100 degrees centigrade may result in excessive degradation of the cellulose ester unless a relatively low concentration of catalyst is used.

Both the concentration of the o-sulfobenzoic anhydride and the time of reaction can be varied over a wide range, depending upon the degree of substitution of sulfobenzoate groups desired. Thus, increasing the reaction time and/or concentration of o-sulfobenzoic anhydride will increase the degree of substitution of o-sulfobenzoate groups in the cellulose ester. On the other hand, an increase in reaction time may also tend toward increasing the amount of degradation of the cellulose ester.

We prefer that the concentration of the o-sulfobenzoic anhydride be from about 5 to 100 weight percent (based on the cellulose ester), a more preferred range being from about 25 to 50 weight percent.

Reaction time will generally vary from about 30 to 180 minutes, and more desirably, from about 60 to 120 minutes, the specific reaction time used depending on the temperature and catalyst concentration.

In order to obtain a material that exhibits not only markedly improved receptivity to basic dyes, but additionally, good heat stability at elevated temperatures, it is desirable to neutralize the catalyst and sulfobenzoate groups present in the cellulose ester. Suitable neutralizing agents include alkali metal salts and alkaline earth metal salts, sodium acetate being a particularly desirable material for this purpose.

After neutralization, the reaction product is readily precipitated from solution by the addition of water. The flake precipitate is thoroughly washed in order to remove the catalyst as well as excess o-sulfobenzoic anhydride, both the catalyst and the anhydride being present in the form of water soluble salts. Thereafter, in order to be assured of complete neutralization, it is desirable to soak the precipitate in a dilute basic solution, e.g., sodium acetate. The product is then removed and recovered as a white, granular solid.

The resulting product, which is a cellulose ester containing o-sulfobenzoate groups, is soluble in acetone, and clear films can readily be cast from the acetone solution. These films may be dyed to deep shades using basic dyes, for example Sevron Blue B (C.I. Basic Blue 21) and Sevron Red 4G (C.I. Basic Red 14). Thus, if Sevron Blue B (C.I. Basic Blue 21) is employed, a deep blue is obtained. Additionally, the initial (undyed) white reaction product, provided it has been properly neutralized, exhibits excellent heat stability. Thus, when subjected to heating in an oven at 220 degrees centigrade for five minutes the product remains white.

In accordance with another aspect of our invention, the foregoing cellulose ester containing sulfobenzoate groups can be prepared directly from cellulose, provided that a certain sequence of reactions is carried out in acid medium. In this embodiment the starting material is cellulose, which cellulose has been pretreated with acetic acid in conventional manner, e.g., using 35 percent of acetic acid based on the weight of cellulose at room temperature for ½ to 1 hour.

The reactions of this embodiment are carried out in the presence of an acid catalyst. Desirably the catalyst is one that may be readily removed from the system, i.e., a catalyst having little or no tendency to react with the cellulose during esterification. Suitable acid catalysts include perchloric acid and trifluoromethane sulfonic acid, with particular preferance being accorded perchloric acid.

The sequential reactions employed in this embodiment of our invention are:

(1) reaction of the water in the pretreated cellulose with a portion of the total acetic anhydride employed;
(2) reaction of the cellulose with o-sulfobenzoic anhydride;
(3) acetylation of cellulose with acetic anhydride; and
(4) neutralization, extraction, washing and drying.

The first step is carried out in order to remove the water prior to carrying out the second step, so that the relatively expensive o-sulfobenzoic anhydride is not consumed by reaction with water. This first step is a relatively fast reaction and requires only a few minutes, typically from about 5 to 10 minutes. This step is generally carried out at an initial temperature of from about 20 to 30 degrees centigrade and is accompanied by a temperature rise of about 5 to 10 degrees centigrade during the course of the reaction. In order to preserve the I.V. (Inherent Viscosity) of the cellulose, only a part of the catalyst, e.g., perchloric acid, to be ultimately used is employed during the first step. Thus, typically the catalyst concentration during the first step will be from about 0.01 to 0.1 weight percent based on the weight of the cellulose. The amount of acetic anhydride employed is generally from about 25 to 50 weight percent based on the weight of the cellulose.

The second step is carried out using desirably from about 10 to 20 percent by weight of o-sulfobenzoic anhydride, based on the weight of the cellulose. The reaction is carried out at a temperature of from about 30 to 40 degrees centigrade, the reaction time being from about 1 to 2 hours. The catalyst concentration during the second step should desirably be from about 0.02 to 0.2 weight percent, based on the weight of the cellulose. Thus, as in the first step, the second step is also carried out using only a part of the total catalyst employed, for here also it is important to preserve the I.V. of the cellulose.

During the second step temperatures lower than 30 degrees centigrade can be employed, e.g., as low as 10 degrees centigrade, but of course, a somewhat longer reaction time is necessary. Temperatures appreciably in excess of 40 degrees centigrade are, however, to be avoided, for such temperatures tend to lead to excessive degradation.

The second step reaction is generally facilitated by the presence of a suitable diluent, e.g., benzene or cyclohexane, benzene being preferred. Only a portion of the total diluent to be employed is used, however, with the remainder of such diluent being added subsequently. Thus, typically only from about 10 to 20 percent of the total diluent employed is present during the second step.

The third step, wherein acetylation with acetic anhydride is effected, is carried out in conventional fashion, utilizing a diluent such as benzene, acetic anhydride, and an acid catalyst such as perchloric acid. Thus, the acetylation mixture of benzene, acetic anhydride and perchloric acid is cooled to about 5 degrees centigrade and is then added to the reaction mixture. An exothermic reaction occurs which peaks at about 45 degrees centigrade. The reaction is continued until acetylation is complete, e.g., about 30 minutes.

The fourth step involves neutralizing the catalyst with a suitable basic solution such as sodium acetate or sodium bicarbonate, etc., with preference being accorded aqueous sodium acetate solution, again washed with water, and then dried.

The products of the foregoing series of reactions is substantially a cellulose triester, e.g., cellulose triacetate containing about 0.3 percent by weight sulfur, which is equivalent to 2.7 mole percent of sulfobenzoate groups. This product is soluble in a methylene chloride/methanol solution, and clear films can readily be cast from such solutions. The films dye readily using basic dyes, e.g., Sevron Blue B (C.I. Basic Blue 21) and Sevron Red 4G (C.I. Basic Red 14). Moreover, the (undyed) product also exhibits good heat stability when tested by heating in an oven at 220 degrees centigrade for five minutes. The heat stability is particularly improved when excess neutralizing agent, e.g., sodium acetate, is employed during the neutralization step.

The following examples will further illustrate our invention. All parts are by weight unless otherwise indicated.

The first three examples illustrate that embodiment of our invention wherein a cellulose ester is the starting material. Examples 4–6 illustrate that embodiment wherein cellulose is employed as the starting material.

EXAMPLE 1

A weight of 20.0 grams cellulose acetate having an acetyl value of 54.5 percent acetic acid and regenerated I.V. of 1.4 was dissolved in 100 grams warm dioxane. The solution was brought to 60 degrees centigrade and then 7 grams of o-sulfobenzoic anhydride and 0.1 gram p-toluene sulfonic acid catalyst were added. The solution was vigorously stirred at 60 degrees centigrade for one hour and then another portion of 7 grams of o-sulfobenzoic anhydride was added. Heating and agitation at 60 degrees centigrade was maintained for one additional hour.

The clear dope was cooled to 15 degrees centigrade and neutralized with a solution of 21 grams of NaOAc·3H$_2$O in 25 milliliters water. After twenty minutes of stirring the solution was added to 2 liters of distilled water, with stirring to precipitate the product. The product was collected and broken up by agitation in a Waring blendor with distilled water. It was then washed thoroughly with distilled water, soaked in 0.6 percent sodium acetate solution (1 liter), washed with distilled water and finally dried at 60 degrees centigrade under vacuum, e.g., about 40 millimeters of mercury pressure.

Analysis of the white, granular product showed a 53.0 percent saponification value as acetic acid, 1.15 regenerated I.V. and 0.88 percent sulfur. Films cast from a 98/2 acetone/water (vol./vol.) were clear. The films were treated with boiling C.I. Basic Blue 21 dye solution for 30 minutes (the dye solution was 0.05 percent concentration in aqueous solution buffered with acetic acid and sodium acetate). The films dyed to a deep blue. The films had excellent dye fastness as indicated by soaking in 1 percent sodium lauryl sulfonate solution at 60 degrees centigrade for one hour.

A portion of the white product was heated in a constant temperature oven at 220 degrees centigrade for five minutes. The product remained white.

EXAMPLE 2

A solution of 20 grams of cellulose acetate having an acetyl value of 54.5 percent acetic acid and 1.4 regenerated I.V. in 200 grams of dioxane was treated with 7 grams of o-sulfobenzoic anhydride and 0.2 gram p-toluene sulfonic acid catalyst for one hour at 60 degrees centigrade. The solution was cooled to 15 degrees centigrade and neutralized with 10.5 grams NaOAc·3H$_2$O dissolved in 12.5 milliliters water. The product was precipitated, washed and dried as described in Example 1.

Analysis of the white, granular product showed a 54.0 percent saponification value as acetic acid, 1.23 regenerated I.V. and 0.35 percent sulfur. Films cast from 98/2 acetone/water (vol./vol.) were clear and dyed to a deep red with boiling C.I. Basic Red 14 solution.

A portion of the white product was heated in a constant temperature oven at 220 degrees centigrade for five minutes. The product remained white.

EXAMPLE 3

A solution of 20 grams of cellulose acetate having an acetyl value of 54.5 percent acetic acid and 1.4 regenerated I.V. in 100 grams dioxane was treated with 7 grams o-sulfobenzoic anhydride and 0.1 gram p-toluene sulfonic acid catalyst for one hour at 60 degrees centigrade. An additional 7 grams o-sulfobenzoic anhydride was added and heating and agitation at 60 degrees centigrade were continued another hour. Then a third portion of 7 grams o-sulfobenzoic anhydride was added and the reaction was continued for an additional hour. The solution was cooled to 15 degrees centigrade and neutralized with 31 grams NaOAc·3H$_2$O dissolved in 45 milliliters water. The product was precipitated, washed and dried as described in Example 1.

Analysis of the white, granular product showed a 53.2 percent saponification value as acetic acid, 0.99 regenerated I.V. and 1.54 percent sulfur. Films cast from 9/1 methylene chloride/methanol (vol./vol.) were clear and dyed to a deep blue with C.I. Basic Blue 21 solution.

A portion of the white product was heated in a constant temperature oven at 220 degrees centigrade for five minutes. The product remained white.

A "control" run was made by dissolving 20 grams of cellulose acetate having an acetyl value of 54.5 percent acetic acid and 1.4 regenerated I.V. in 200 grams dioxane, adding 0.2 gram p-toluene sulfonic acid and heating with agitation at 60 degrees centigrade for one hour. The dope was precipitated in denatured ethyl alcohol and the product washed with denatured ethyl alcohol, water and dried. Films cast from 98/2 acetone/water (vol./vol.) did not dye with boiling C.I. Basic Blue 21 solution.

Another "control" run was made by dissolving 20 grams cellulose acetate having an acetyl value of 54.5 percent acetic acid and 1.4 regenerated I.V. in 200 grams dioxane, adding 7 grams phthalic anhydride, 0.2 gram p-toluene sulfonic acid and heating with agitation at 60 degrees centigrade for one hour. The dope was precipitated in denatured ethyl alcohol and the product washed thoroughly with denatured ethyl alcohol, then water and finally dried. Films cast from 98/2 acetone/water (vol./vol.) did not dye with boiling C.I. Basic Blue 21 solution.

EXAMPLE 4

A weight of 63 grams cotton linters was pretreated with 35 percent glacial acetic acid. To the pretreated cellulose at room temperature there was added a solution of 18.0 grams acetic anhydride, 60 milliliters benzene and perchloric acid catalyst amounting to 0.1 percent, based on the weight of dry cellulose. The reaction mixture was stirred for five minutes, during which period the temperature increased from 28 degrees centigrade to 36 degrees centigrade. A weight of 6.0 grams o-sulfobenzoic anhydride was added and the reaction mixture was stirred for one hour, during which period the temperature decreased from 36 degrees centigrade to 28 degrees centigrade. A solution of 546 milliliters benzene and 174 grams acetic anhydride was cooled to 5 degrees centigrade and then perchloric acid catalyst added to the cooled solution, the catalyst amounting to 0.9 percent, based on the weight of dry cellulose. The cold solution was added to the foregoing reaction mixture at room temperature and the mixture continually stirred. The exothermic reaction peaked at 46 degrees centigrade, taking 16 minutes to reach peak temperature. The reaction mixture was occasionally stirred for an additional 30 minutes as the temperature decreased from 46 degrees centigrade to 32 degrees centigrade. The reaction mixture was cooled to 15 degrees centigrade and then 30 grams of sodium acetate solution, prepared by dissolving 16.6 grams $NaOAc \cdot 3H_2O$ in 134 milliliters water, added.

The reaction mixture was filtered and the residue was washed with benzene, cold water, hot water, soaked in 0.6 percent sodium acetate solution for one hour, washed with distilled water, and then dried at 60 degrees centigrade under vacuum (40 millimeters of mercury pressure).

Analysis of the white, fibrous product showed a 61.8 percent saponification value as acetic acid, 1.66 regenerated I.V., and 0.20 percent sulfur. Films cast from a 9/1 methylene chloride/methanol (vol./vol.) solution were clear and dyed to a light blue with boiling C.I. Basic Blue 21 solutioin (0.05 percent dye solution buffered with sodium acetate and acetic acid). The dyed films had good dye fastness as indicated by soaking in 1 percent Orvus solution for one hour at 60 degrees centigrade.

A "control" run prepared in a similar manner, but omitting the o-sulfobenzoic anhydride, resulted in films that did not dye with boiling C.I. Basic Blue 21 solution.

EXAMPLE 5

Example 4 was repeated using the same procedure except that 12.0 grams o-sulfobenzoic anhydride was used. Analysis of the product showed a 61.3 percent saponification value as acetic acid, 1.50 regenerated I.V. and 0.29 percent sulfur. Films cast from 9/1 methylene chloride/methanol (vol./vol.) were clear and dyed to a light blue with boiling C.I. Basic Blue 21 solution.

EXAMPLE 6

Example 4 was repeated suing the same procedure except that 12.0 grams o-sulfobenzoic anhydride was used and neutralization was carried out using an excess of sodium acetate (20.4 grams $NaOAc \cdot 3H_2O$ dissolved in 50 milliliters water).

Analysis of the product showed a 61.8 percent saponification value as acetic acid, 1.92 regenerated I.V. and 0.26 percent sulfur. Films cast from 9/1 methylene chloride/methanol (vol./vol.) were clear and dyed to a light blue with boiling C.I. Basic Blue 21 solution.

A portion of the white product was heated in a constant temperature oven at 220 degrees centigrade, for five minutes. The product remained white.

It is to be understood that the foregoing detailed description is given merely by way of illustration and that many variations may be made therein without departing from the spirit of our invention.

The embodiments of the invention in which an exclusive property or privilege is claimed are defined as follows:

1. A method for the preparation of a water insoluble cellulose derivative of enhanced basic dyeability and improved heat stability comprising
    (1) esterifying a cellulose ester containing free hydroxyl groups,
        with o-sulfobenzoic anhydride in the presence of an effective amount of an acid catalyst for a period of from about 30 to about 180 minutes at a temperature of from about 25 to 100 degrees centigrade; and
    (2) recovering a water-insoluble film and fiber-forming cellulose material containing o-sulfobenzoate groups.

2. The method of claim 1, wherein said catalyst is an organic sulfonic acid.

3. A method for the preparation of an acetone soluble, water-insoluble cellulose derivative of enhanced basic dyeability and improved heat stability comprising
    (1) esterifying a cellulose acetate having an acetyl content between about 54 and 62 percent by weight, calculated as acetic acid
        with from about 25 to about 50 weight percent, based upon said cellulose acetate, of o-sulfobenzoic anhydride in the presence of from about 0.1 to 1.0 weight percent of an acid catalyst at a temperature of from about 25 to about 100 degrees centigrade for a period from about 30 to about 180 minutes; and
    (2) recovering a water-insoluble film and fiber-forming cellulose acetate containing o-sulfobenzoate groups.

4. The method of claim 1 wherein the cellulose ester is cellulose acetate having an acetyl content of from about 50 to 62 percent by weight, calculated as acetic acid.

5. The method of claim 4 wherein said cellulose ester is secondary cellulose acetate and wherein said esterification is carried out for from about 60 to 120 minutes at a temperature of from about 50 to 70 degrees centigrade.

6. The method of claim 5 wherein said esterification is carried out in the presence of a solvent.

7. The method of claim 1 wherein the concentration of said catalyst is from about 0.1 to 1.0 percent by weight based upon said cellulose ester.

8. The method of claim 7 wherein the concentration of said o-sulfobenzoic anhydride is from about 5 to 100 weight percent, based on said cellulose ester.

9. The method of claim 8 wherein the resulting o-sulfobenzoated material is neutralized by treatment with a neutralizing agent selected from the group consisting of alkali metal salts and the alkaline earth metal salts.

10. The method of claim 9 wherein the neutralizing agent is sodium acetate.

11. A method for the preparation of a water-insoluble cellulose derivative of enhanced basic dyeability and improved heat stability comprising:
    (1) esterifying cellulose which has been pretreated with acetic acid to reduce the water content thereof to less than 1.0 weight percent,
        with o-sulfobenzoic anhydride in the presence of an effective amount of an acid catalyst for a period of from about 30 to about 180 minutes at a temperature of from about 25 to 100 degrees centigrade;

(2) acetylating the resulting material with acetic anhydride; and (3) recovering a water-insoluble film and fiber-forming cellulose material containing o-sulfobenzoate groups.

12. The method of claim 11 wherein there is employed from about 10 to 20 weight percent of o-sulfobenzoic anhydride, based on said cellulose.

13. The method of claim 12 wherein said sulfobenzoation is carried out at a temperature of from about 30 to 40 degrees centigrade.

14. The method of claim 13 wherein during said sulfobenzoation there is present benzene as a diluent.

15. The method of claim 11 wherein after said acetylation the resulting product is neutralized.

References Cited

UNITED STATES PATENTS

| | | | |
|---|---|---|---|
| 1,933,815 | 11/1933 | Malm et al. | 260—215 |
| 2,241,235 | 5/1941 | Bachman | 260—224 |
| 2,899,423 | 8/1959 | Malm et al. | 260—227 |

DONALD E. CZAJA, Primary Examiner

R. W. GRIFFIN, Assistant Examiner

U.S. Cl. X.R.

8—116, 120; 260—214, 230